US008461234B2

(12) United States Patent
Bhattacharya et al.

(10) Patent No.: US 8,461,234 B2
(45) Date of Patent: *Jun. 11, 2013

(54) REFINISH COATING COMPOSITIONS COMPRISING LOW MOLECULAR WEIGHT CELLULOSE MIXED ESTERS

(75) Inventors: Deepanjan Bhattacharya, Kingsport, TN (US); Roy Glenn Foulk, Kingsport, TN (US); Hampton Loyd Chip Williams, III, Kingsport, TN (US); Michael Charles Shelton, Kingsport, TN (US); Jessica Dee Posey-Dowty, Kingsport, TN (US); Luis Guillermo Rios Perdomo, Kingsport, TN (US); Lisa Perdomo, legal representative, Kingsport, TN (US); Daniel Wayne Dixon, Jr., Church Hill, TN (US); Paul Lee Lucas, Gray, TN (US); Alan Kent Wilson, Kingsport, TN (US); Kenneth Raymond Walker, Dunblane (GB); Jonathan Edward Lawniczak, Kingsport, TN (US); Hieu Duy Phan, Antioch, IL (US); Charlie Carroll Freeman, Jr., Grundy, VA (US)

(73) Assignee: Eastman Chemical Company, Kingsport, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 12/728,427

(22) Filed: Mar. 22, 2010

(65) Prior Publication Data
US 2011/0020559 A1 Jan. 27, 2011

Related U.S. Application Data

(60) Continuation-in-part of application No. 12/510,324, filed on Jul. 28, 2009, now Pat. No. 8,003,715, which is a division of application No. 10/796,176, filed on Mar. 9, 2004, now Pat. No. 7,585,905.

(60) Provisional application No. 60/455,033, filed on Mar. 14, 2003, provisional application No. 61/162,513, filed on Mar. 23, 2009.

(51) Int. Cl.
C08L 1/14 (2006.01)
C09D 101/14 (2006.01)

(52) U.S. Cl.
USPC .......... 524/39; 524/35; 524/38; 536/58; 536/66; 522/88

(58) Field of Classification Search
USPC ............ 524/39, 38, 35; 536/58, 66; 522/88
See application file for complete search history.

(56) References Cited

U.S. PATENT DOCUMENTS

| 1,652,573 A | 12/1927 | Mallabar |
| 1,683,347 A | 9/1928 | Gray et al. |
| 1,878,954 A | 9/1932 | Malm |
| 2,129,052 A | 9/1938 | Fordyce |
| 2,801,239 A | 7/1957 | Hiatt et al. |
| 3,281,267 A | 10/1966 | Rice |
| 3,386,932 A | 6/1968 | Steinmann |
| 3,391,135 A | 7/1968 | Ouno et al. |
| 3,411,941 A | 11/1968 | Lowe et al. |
| 3,429,840 A | 2/1969 | Lowe et al. |
| 3,518,249 A | 6/1970 | Hiatt et al. |
| 3,850,770 A | 11/1974 | Juna et al. |
| T941001 I4 | 12/1975 | Corpening et al. |
| 3,998,768 A | 12/1976 | Pettit |
| 4,007,144 A | 2/1977 | Sanders et al. |
| 4,134,809 A | 1/1979 | Pacifici et al. |
| 4,170,663 A | 10/1979 | Hahn et al. |
| 4,389,502 A | 6/1983 | Fry et al. |
| 4,407,990 A | 10/1983 | Hall et al. |
| 4,408,028 A | 10/1983 | Nakayama et al. |
| 4,415,734 A | 11/1983 | Yabune et al. |
| 4,442,145 A | 4/1984 | Probst et al. |
| 4,532,177 A | 7/1985 | Mahar |
| 4,543,409 A | 9/1985 | Diamantoglou et al. |
| 4,551,491 A | 11/1985 | Panush |
| 4,551,492 A | 11/1985 | Aerts |
| 4,565,730 A | 1/1986 | Poth et al. |
| 4,590,265 A | 5/1986 | Bogan et al. |
| 4,595,722 A | 6/1986 | Such |
| 4,598,015 A | 7/1986 | Panush |
| 4,598,020 A | 7/1986 | Panush |

(Continued)

FOREIGN PATENT DOCUMENTS
EP 0 267 409 B1 5/1988
EP 0 289 997 A2 11/1988
(Continued)

OTHER PUBLICATIONS

Kirk-Othmer, Encyclopedia of Chemical Technology, Fourth Ed., vol. 5, pp. 496-529, 509 (1993), John Wiley & Sons, New York, New York.

Nishimura, T.; Nakatsubo, F. "Chemical Synthesis of Cellulose Derivatives by a Convergent Synthetic Method and Several of Their Properites," Cellulose, 1997, 4, 109.

Kawada, T.; Nakatsubo, F.; Murakami, K.; Sakuno, T. "Synthetic Studies of Cellulose IX: Reactivity and Cleavage of Three Kinds of Protective Groups of Synthesized Celloologosaccharide Derivatives," *Mokuzai Gakkaishi*, 1991, 37 (10), 930.

Kawada, T.; Nakatsubo, F.; Umezawa, T.; Murakami, K.; Sakuno, T. "Synthetic Studies of Cellulose XII: First Chemical Synthesis of Cellooctaose Acetate," *Mokuzai Gakkaishi*, 1994, 40 (7), 738.

(Continued)

Primary Examiner — Terressa Boykin
(74) Attorney, Agent, or Firm — Steven A. Owen; Polly C. Owen

(57) ABSTRACT

A refinish coating composition is provided comprising: a) at least one refinish coating resin; b) at least one solvent; c) at least one pigment; d) optionally, at least one crosslinking agent; e) at least one cellulose mixed ester having a weight average molecular weight ($M_w$) greater than 10,000 and f) at least one low molecular weight cellulose mixed ester. In addition, processes for coating the refinish coating composition on a substrate are also provided.

17 Claims, No Drawings

U.S. PATENT DOCUMENTS

| | | | |
|---|---|---|---|
| 4,598,111 | A | 7/1986 | Wright et al. |
| 4,603,160 | A | 7/1986 | Leonard |
| 4,605,687 | A | 8/1986 | Panush |
| 4,650,821 | A | 3/1987 | Leonard |
| 4,692,481 | A | 9/1987 | Kelly |
| 4,707,381 | A | 11/1987 | Toyama et al. |
| 4,714,634 | A | 12/1987 | Miyazona et al. |
| 4,725,640 | A | 2/1988 | Cowles |
| 4,732,790 | A | 3/1988 | Blackburn et al. |
| 4,732,791 | A | 3/1988 | Blackburn et al. |
| 4,740,541 | A | 4/1988 | Morse |
| 4,753,829 | A | 6/1988 | Panush |
| 4,755,581 | A | 7/1988 | Blackburn et al. |
| 4,755,582 | A | 7/1988 | Blackburn et al. |
| 4,829,108 | A | 5/1989 | Okuda et al. |
| 4,855,184 | A | 8/1989 | Klun et al. |
| 4,859,758 | A | 8/1989 | Shalati et al. |
| 4,888,372 | A | 12/1989 | Abrams et al. |
| 4,902,578 | A | 2/1990 | Kerr, III |
| 4,970,247 | A | 11/1990 | Hoppe et al. |
| 4,975,300 | A | 12/1990 | Deviny |
| 4,983,730 | A | 1/1991 | Domeshek et al. |
| 5,051,473 | A | 9/1991 | Tabuchi et al. |
| 5,086,144 | A | 2/1992 | Shalati et al. |
| 5,089,313 | A | 2/1992 | Cope |
| 5,091,010 | A | 2/1992 | Souma et al. |
| 5,256,453 | A | 10/1993 | Heithorn et al. |
| 5,260,358 | A | 11/1993 | Shimizu et al. |
| 5,283,126 | A | 2/1994 | Rasmussen et al. |
| 5,292,783 | A | 3/1994 | Buchanan et al. |
| 5,292,876 | A | 3/1994 | Simmons |
| 5,321,063 | A | 6/1994 | Shimada et al. |
| 5,322,560 | A | 6/1994 | DePue et al. |
| 5,360,644 | A | 11/1994 | Briggs et al. |
| 5,372,638 | A | 12/1994 | DePue et al. |
| 5,384,163 | A | 1/1995 | Budde et al. |
| 5,389,139 | A | 2/1995 | Carpenter et al. |
| 5,418,293 | A | 5/1995 | Numa et al. |
| 5,425,969 | A | 6/1995 | Wakabayashi et al. |
| 5,449,555 | A | 9/1995 | Karstens et al. |
| 5,473,032 | A | 12/1995 | Bederke et al. |
| 5,478,386 | A | 12/1995 | Itoh et al. |
| 5,480,922 | A | 1/1996 | Mülhaupt et al. |
| 5,498,663 | A | 3/1996 | Shimada et al. |
| 5,498,781 | A | 3/1996 | Hall et al. |
| 5,504,178 | A | 4/1996 | Shaffer et al. |
| 5,510,443 | A | 4/1996 | Shaffer et al. |
| 5,520,963 | A | 5/1996 | Liu |
| 5,527,848 | A | 6/1996 | Carpenter et al. |
| 5,545,677 | A | 8/1996 | Hall et al. |
| 5,552,458 | A | 9/1996 | Hall et al. |
| 5,580,819 | A | 12/1996 | Li et al. |
| 5,585,186 | A | 12/1996 | Scholz et al. |
| 5,624,757 | A | 4/1997 | Smith |
| 5,658,976 | A | 8/1997 | Carpenter et al. |
| 5,663,310 | A | 9/1997 | Shimoda et al. |
| 5,668,273 | A | 9/1997 | Allen et al. |
| 5,670,141 | A | 9/1997 | Nebra |
| 5,705,632 | A | 1/1998 | Shimoda et al. |
| 5,720,803 | A | 2/1998 | Itoh et al. |
| 5,721,015 | A | 2/1998 | Iwamura et al. |
| 5,741,880 | A | 4/1998 | Valpey et al. |
| 5,744,243 | A | 4/1998 | Li et al. |
| 5,753,373 | A | 5/1998 | Scholz et al. |
| 5,759,631 | A | 6/1998 | Rink et al. |
| 5,821,315 | A | 10/1998 | Moriya et al. |
| 5,856,468 | A | 1/1999 | Shuto et al. |
| 5,873,931 | A | 2/1999 | Scholz et al. |
| 5,914,309 | A | 6/1999 | Ulbl et al. |
| 5,914,397 | A | 6/1999 | Kiyose et al. |
| 5,919,920 | A | 7/1999 | Murakami et al. |
| 5,942,030 | A | 8/1999 | Schuhmacher et al. |
| 5,962,677 | A | 10/1999 | Murakami et al. |
| 5,990,304 | A | 11/1999 | Kiyose et al. |
| 5,993,526 | A | 11/1999 | Sommer et al. |
| 5,994,530 | A | 11/1999 | Posey-Dowty et al. |
| 5,997,621 | A | 12/1999 | Scholz et al. |
| 5,998,035 | A | 12/1999 | Iwamura et al. |
| 6,001,484 | A | 12/1999 | Horrion et al. |
| 6,001,931 | A | 12/1999 | Brahm et al. |
| 6,025,433 | A | 2/2000 | Shibatoh et al. |
| 6,040,053 | A | 3/2000 | Scholz et al. |
| 6,046,259 | A | 4/2000 | Das et al. |
| 6,051,242 | A | 4/2000 | Patel et al. |
| 6,099,973 | A | 8/2000 | Miyai et al. |
| 6,207,601 | B1 | 3/2001 | Maurer et al. |
| 6,218,448 | B1 | 4/2001 | Kraaijevanger et al. |
| 6,225,404 | B1 | 5/2001 | Sorenson et al. |
| 6,228,433 | B1 | 5/2001 | Witt |
| 6,261,642 | B1 | 7/2001 | Nagai et al. |
| 6,303,670 | B1 | 10/2001 | Fujino et al. |
| 6,313,202 | B1 | 11/2001 | Buchanan et al. |
| 6,331,326 | B1 | 12/2001 | Tsunoda et al. |
| 6,355,303 | B1 | 3/2002 | Vogt-Birnbrich et al. |
| 6,403,152 | B1 | 6/2002 | Puligadda et al. |
| 6,407,151 | B1 | 6/2002 | Hoppe et al. |
| 6,407,224 | B1 | 6/2002 | Mironov et al. |
| 6,509,440 | B1 | 1/2003 | Sakane et al. |
| 6,512,044 | B1 | 1/2003 | Wilke |
| 6,522,812 | B1 | 2/2003 | Nikonov |
| 6,544,593 | B1 | 4/2003 | Nagata et al. |
| 6,592,944 | B1 | 7/2003 | Uhlianuk et al. |
| 6,596,069 | B2 | 7/2003 | Ido et al. |
| 6,607,833 | B1 | 8/2003 | Uhlianuk et al. |
| 6,609,677 | B2 | 8/2003 | Seybold et al. |
| 6,632,852 | B1 | 10/2003 | Chen et al. |
| 6,635,314 | B1 | 10/2003 | William et al. |
| 6,653,411 | B2 | 11/2003 | Puligadda et al. |
| 6,656,983 | B1 | 12/2003 | Mayer et al. |
| 6,689,839 | B1 | 2/2004 | Hayakawa et al. |
| 6,696,142 | B2 | 2/2004 | Baer et al. |
| 6,758,992 | B2 | 7/2004 | Solomon et al. |
| 6,861,495 | B2 | 3/2005 | Barsotti et al. |
| 6,870,024 | B2 | 3/2005 | Haubennestel et al. |
| 6,903,145 | B2 | 6/2005 | Nienhaus et al. |
| 6,913,831 | B2 | 7/2005 | Suzuki |
| 6,930,161 | B2 | 8/2005 | Schwarte et al. |
| 6,987,144 | B2 | 1/2006 | Anderson et al. |
| 6,997,980 | B2 | 2/2006 | Wegner et al. |
| 7,001,948 | B2 | 2/2006 | Gupta et al. |
| 7,026,470 | B2 | 4/2006 | Obie |
| 7,208,534 | B2 | 4/2007 | Van Rooyen |
| 7,585,905 | B2 | 9/2009 | Shelton et al. |
| 2002/0197411 | A1 | 12/2002 | Colyer et al. |
| 2003/0059547 | A1 | 3/2003 | Rihan et al. |
| 2003/0161961 | A1 | 8/2003 | Barsotti et al. |
| 2003/0212171 | A1 | 11/2003 | Frederick et al. |
| 2004/0058083 | A1 | 3/2004 | Lettmann et al. |
| 2004/0101629 | A1 | 5/2004 | Baumgart et al. |
| 2004/0110895 | A1 | 6/2004 | Anderson et al. |
| 2004/0180993 | A1 | 9/2004 | Shelton et al. |
| 2004/0181009 | A1 | 9/2004 | Shelton et al. |
| 2004/0185269 | A1 | 9/2004 | Loper et al. |
| 2005/0031873 | A1 | 2/2005 | Berschel et al. |
| 2005/0100740 | A1 | 5/2005 | Lin et al. |
| 2005/0123781 | A1 | 6/2005 | Drescher et al. |
| 2005/0132781 | A1 | 6/2005 | Seo et al. |
| 2005/0186349 | A1 | 8/2005 | Loper et al. |
| 2005/0203278 | A1 | 9/2005 | McCreight et al. |
| 2005/0227162 | A1 | 10/2005 | Van Rooyen |
| 2006/0052525 | A1 | 3/2006 | Staunton et al. |
| 2006/0100353 | A1 | 5/2006 | Barsotti et al. |
| 2006/0123890 | A1 | 6/2006 | Seo et al. |
| 2007/0028806 | A1 | 2/2007 | Piro et al. |
| 2007/0088105 | A1 | 4/2007 | Shelton et al. |
| 2007/0282038 | A1 | 12/2007 | Bhattacharya et al. |
| 2008/0032067 | A1 | 2/2008 | Sakurazawa et al. |
| 2008/0069963 | A1 | 3/2008 | Bhattacharya et al. |
| 2008/0085953 | A1 | 4/2008 | Bhattacharya et al. |
| 2008/0090960 | A1 | 4/2008 | Bhattacharya et al. |

FOREIGN PATENT DOCUMENTS

| | | |
|---|---|---|
| EP | 0 515 208 A3 | 11/1992 |
| EP | 0 547 614 A3 | 6/1993 |
| EP | 0 455 211 B2 | 4/1995 |
| EP | 0 803 552 B2 | 5/2000 |
| EP | 1 574 554 A3 | 9/2005 |

| | | |
|---|---|---|
| FR | 2 244 572 | 4/1975 |
| GB | 1 122 006 | 7/1968 |
| JP | 51-119088 | 10/1976 |
| JP | 51-119089 | 10/1976 |
| JP | 59-152901 | 8/1984 |
| JP | 11-035601 | 2/1999 |
| WO | WO 82/02719 | 8/1982 |
| WO | WO 91/16356 | 10/1991 |
| WO | WO 96/20961 | 7/1996 |
| WO | WO 98/33821 A1 | 8/1998 |
| WO | WO 99/59753 | 11/1999 |
| WO | WO 01/35719 | 5/2001 |
| WO | WO 0236637 A1 | 5/2002 |
| WO | WO 03/070843 A1 | 8/2003 |
| WO | WO 2004/083253 A1 | 9/2004 |
| WO | WO 2004/094515 A1 | 11/2004 |
| WO | WO 2006/116367 A1 | 11/2006 |
| WO | WO 2007/005808 A2 | 1/2007 |
| WO | WO 2007/145929 A2 | 12/2007 |
| WO | WO 2008/036274 A1 | 3/2008 |

OTHER PUBLICATIONS

"Characterization of Cellulose Esters by Solution-State and Solid-State Nuclear Magnetic Resonance Spectroscopy," Editors: T. J. Heinze and W. G. Glasser, Chapter 10 in the ACS Symposium Series 688 :Cellulose Derivatives—Modification, Characterization, and Nanostructures, Douglas W. Lowman, 131-162 (1998).

Miyamoto, T.; Sato, Y.; Shibata, T.; Inagaki, H.; Tanahashi, M; *J. Polym. Sci., Polym. Chem. Ed.*, 1984, 22, 2363.

Malm, Carl J.; Fordyce, Charles R.; Tanner, Howard A. "Properties of Cellulose Esters of Acetic, Propionic, and Butyric Acids," *Ind. Eng. Chem.*, 1942, 34(4), 430.

Abatzoglou, N.; Chornet, E. "Acid Hydrolysis of Hemicelluloses and Cellulose: Theory and Applications," in *Polysaccharides: Structural Diversity and Functional Versatility*, ed. S. Dumitriu, Marcel Dekker, Inc., New York, 1998.

Buchanan, C. M.; Hyatt, J. A.; Kelley, S. S.; Little, J. L.; *Macromolecules*, 1990, 23, 3747.

Dickey, E. E.; Wolfrom, J. L., A Polymer-Homologous Series of Sugar Acetates from the Acetolysis of Cellulose,: *J. Am. Chem. Soc.*, 1949, 825.

Wolfrom, M. L.; Dacons, J. C., "The Polymer-Homologous Series of Oligosaccharides from Cellulose," *J. Am. Chem. Soc.*, 1952, 5331.

Research Disclosure, Sep. 1978, 17304, p. 19.

International Search Report and Written Opinion of the International Searching Authority for Corresponding PCT/US2006/015573.

Copending U.S. Appl. No. 11/810,011, filed Jun. 4, 2007.

Copending U.S. Appl. No. 11/856,176, filed Sep. 17, 2007.

Copending U.S. Appl. No. 11/845,179 filed Sep. 17, 2007.

Office Action dated May 16, 2007 from United States Patent and Trademark Office for co-pending U.S. Appl. No. 10/796,176.

Office Action dated May 16, 2007 from United States Patent and Trademark Office for co-pending U.S. Appl. No. 10/796,235.

Office Action dated Jan. 17, 2008 from United States Patent and Trademark Office for co-pending U.S. Appl. No. 10/796,235.

Office Action dated Jan. 25, 2008 from United States Patent and Trademark Office for co-pending U.S. Appl. No. 10/796,176.

Office Action dated Mar. 28, 2008 from United States Patent and Trademark Office for co-pending U.S. Appl. No. 11/810,011.

Office Action from the United States Patent and Trademark Office with Mail Date of Sep. 30, 2008 for U.S. Appl. No. 10/796,235.

Office Action from the United States Patent and Trademark Office with Mail Date of Apr. 2, 2009 for U.S. Appl. No. 11/394,008.

PCT International Search Report and Written Opinion with Date of Mailing Jan. 8, 2010 for Related PCT/US2009/005144 Application.

USPTO Notice of Allowance dated Jun. 1, 2009 for U.S. Appl. No. 10/796,176.

Office Action from the United States Patent and Trademark Office with Mail Date of May 26, 2009 for U.S. Appl. No. 10/796,235.

Office Action from the United States Patent and Trademark Office with Mail Date of Jan. 22, 2010 for U.S. Appl. No. 11/394,008.

Copending U.S. Appl. No. 12/510,324, filed Jul. 28, 2009, Michael Charles Shelton, et al.

Copending U.S. Appl. No. 12/559,744, filed Sep. 15, 2009, Deepanjan Bhattacharya, et al.

Copending U.S. Appl. No. 12/728,427, filed Mar. 22, 2010, Michael Charles Shelton, et al.

USPTO Office Action dated Apr. 9, 2008 for copending U.S. Appl. No. 11/810,065.

USPTO Office Action dated Aug. 4, 2010 for copending U.S. Appl. No. 11/394,008.

USPTO Notice of Allowance dated Oct. 7, 2010 for copending U.S. Appl. No. 10/796,235.

USPTO Office Action dated Oct. 7, 2010 for copending U.S. Appl. No. 12/510,324.

USPTO Office Action dated Oct. 8, 2010 for copending U.S. Appl. No. 12/559,744.

USPTO Notice of Allowance dated Apr. 20, 2011 for copending U.S. Appl. No. 12/510,324.

USPTO Office Action dated May 5, 2011 for copending U.S. Appl. No. 12/559,744.

USTPO Notice of Allowance dated Apr. 20, 2011 for copending U.S. Appl. No. 12/510,324.

USPTO Notice of Allowance dated Jun. 8, 2011 for copending U.S. Appl. No. 11/394,008.

USPTO Notice of Allowance dated Dec. 23, 2011 for copending U.S. Appl. No. 12/559,744.

Extended European Search Report dated Oct. 10, 2011 received in EP Patent Application No. 10011755.5-2115.

REFINISH COATING COMPOSITIONS COMPRISING LOW MOLECULAR WEIGHT CELLULOSE MIXED ESTERS

RELATED APPLICATIONS

This application is a continuation in part application of U.S. Divisional Application Ser. No. 12/510,324 and issued as U.S. Pat. No. 8,003,715, which claims priority to U.S. Divisional application Ser. No. 12/510,324 and issued as U.S. Pat. No. 8,003,715, filed Jul. 28, 2009, which claims priority to U.S. Non-Provisional application Ser. No. 10/796,176 filed on Mar. 9, 2004 and issued as U.S. Pat. No. 7,585,905, which claims priority to U.S. Provisional Application 60/455,033 filed on Mar. 14, 2003; and it also claims priority to U.S. Provisional Application Ser. No. 61/162,513 filed Mar. 23, 2009, the disclosures of which are herein incorporated by reference in their entirety to the extent they do not contradict the statements herein.

FIELD OF THE INVENTION

This invention belongs to the field of cellulose chemistry, and more particularly, to low molecular weight cellulose mixed esters that are useful in coating and ink compositions as low viscosity binder resins and rheology modifiers. More particularly, this invention relates to the use of low molecular weight cellulose mixed esters in refinish coating compositions.

BACKGROUND OF THE INVENTION

Automotive refinish coating compositions have traditionally been based on low solids solvent-borne technology. This enables the use of high molecular weight resins and fast evaporating solvents, both of which enable rapid drying under ambient conditions thereby minimizing issues related to dirt pick-up and sag in the body shops. However, environmental legislation across the globe has resulted in the paint industry attempting to move towards greener and more 'eco-friendly' products with similar performance attributes as conventional coating formulations. Increases in the total solids content or a replacement of certain organic solvents by water are two alternatives available to the coating suppliers to limit the amount of volatile organic compounds (VOC) in the coating formulation.

High solids coatings have limited degree of film shrinkage owing to the reduced amounts of solvent whereas waterborne systems have relatively slow evaporation rates compared to standard organic solvents. Hence one of the challenges facing the automotive refinish coatings market is to tailor newer technologies (both high solids and waterborne) to achieve comparable degrees of aluminum flake control as observed in conventional solvent-borne low solids coating systems.

While waterborne refinish coatings do offer reduced Volatile Organic Content (VOC) emissions, there are several challenges associated with adopting this technology in a typical collision repair facility. These may range from modifying the air-flow in the spray booth to upgrading the spray equipment in order to specifically apply water based coatings. The additional provisions that are needed to equip the body-shops to spray waterborne paints would come with an increased level of capital investment. Therefore a performance additive that can enable the continued use of solvent-borne refinish coatings but at higher levels of non-volatile content will not only help reduce VOC emissions but also avoid conversion costs (to waterborne refinish coatings) and account for higher throughput due to the increased total solids in the coating composition.

This invention provides for the use of low molecular weight cellulose mixed esters in a refinish coating composition, which can raise the non-volatile content of the paint by 60% (when compared to conventional low-solids solvent-borne refinish coatings) and yet provide comparable performance to the traditional systems.

The automotive refinish coatings business in North America is under pressure to move to formulations that are lower in solvent emissions. A number of states have initiated a move to mandate the use of lower VOC coatings for automotive refinish applications. Therefore there exists an unmet need to develop refinish coating technologies with lower VOC emissions without compromising on the final performance attributes of the coating composition. The incorporation of low molecular weight cellulose mixed esters in a refinish coating formulation was found to increase the solids level in the paint by as much as 60% when compared to coatings that had similar amounts of conventional cellulose esters, such as, CAB 381-20 cellulose ester produced by Eastman Chemical Company, without causing any significant impact on the spray application viscosity. The low molecular weight cellulose mixed esters can be obtained from Eastman as Developmental Performance Additive (DPA) 2386. The increased levels of solid in the refinish coating composition can result in lower solvent emissions, thereby lowering VOC levels as well as improving the overall productivity of a repair facility by yielding excellent appearance properties.

SUMMARY OF THE INVENTION

In one embodiment of the invention, a refinish coating composition is provided comprising: a) at least one refinish coating resin; b) at least one solvent; c) at least one pigment; d) optionally, at least one crosslinking agent; e) at least one cellulose mixed ester having a weight average molecular weight ($M_w$) greater than 10,000 and f) at least one low molecular weight cellulose mixed ester selected from the group consisting of:

(1) a low molecular weight cellulose mixed ester having:
 a total degree of substitution per anhydroglucose unit of from about 3.08 to about 3.50, having the following substitutions:
  a degree of substitution per anhydroglucose unit of hydroxyl of no more than about 0.70,
  a degree of substitution per anhydroglucose unit of $C_3$-$C_4$ esters from about 0.80 to about 1.40, and
  a degree of substitution per anhydroglucose unit of acetyl of from about 1.20 to about 2.34;
 an inherent viscosity of from about 0.05 to about 0.15 dL/g, as measured in a 60/40 (wt./wt.) solution of phenol/tetrachloroethane at 25° C.;
 a number average molecular weight ($M_n$) of from about 1,000 to about 5,600;
 a weight average molecular weight ($M_w$) of from about 1,500 to about 10,000; and
 a polydispersity of from about 1.2 to about 3.5;
(2) a low molecular weight cellulose mixed ester having:
 a total degree of substitution per anhydroglucose unit of from about 3.08 to about 3.50, having the following substitutions:
  a degree of substitution per anhydroglucose unit of hydroxyl of no more than about 0.70;
  a degree of substitution per anhydroglucose unit of $C_3$-$C_4$ esters from about 1.40 to about 2.45, and a degree of substitution per anhydroglucose unit of
   acetyl of from about 0.20 to about 0.80;
an inherent viscosity of from about 0.05 to about 0.15 dL/g,
   as measured in a 60/40 (wt./wt.) solution of phenol/
   tetrachloroethane at 25° C.;
a number average molecular weight ($M_n$) of from about
   1,000 to about 5,600;
a weight average molecular weight ($M_w$) of from about
   1,500 to about 10,000;
a polydispersity of from about 1.2 to about 3,
(3) a low molecular weight cellulose mixed ester having:
a total degree of substitution per anhydroglucose unit of
   from about 3.08 to about 3.50, having the following
   substitutions:
   a degree of substitution per anhydroglucose unit of
      hydroxyl of no more than about 0.70;
   a degree of substitution per anhydroglucose unit of
      $C_3$-$C_4$ esters from about 1.40 to about 2.45, and
   a degree of substitution per anhydroglucose unit of
      acetyl of from about 0.20 to about 0.80;
an inherent viscosity of from about 0.05 to about 0.15 dL/g,
   as measured in a 60/40 (wt./wt.) solution of phenol/
   tetrachloroethane at 25° C.;
a number average molecular weight ($M_n$) of from about
   1,000 to about 5,600;
a weight average molecular weight ($M_w$) of from about
   1,500 to about 10,000; and
a polydispersity of from about 1.2 to about 3.5; and mixtures of said low molecular weight cellulose mixed esters.

In another embodiment of the invention, a process of coating a substrate is provided comprising: a) applying at least one primer layer to the substrate, b) applying at least one refinish coating composition layer to the primer layer; wherein the refinish coating composition layer comprises the refinish coating composition, and c) applying at least one clearcoat layer to the refinish coating composition layer.

In another embodiment of the invention, a process of coating a substrate is provided comprising: a) applying at least one primer layer to the substrate, b) applying at least one refinish coating composition layer to the primer layer, and c) applying at least one clearcoat layer to the refinish coating composition; wherein the refinish coating composition layer is applied when the primer layer is wet; wherein the refinish coating composition layer comprises the refinish coating composition.

In another embodiment of the invention, a process of coating a substrate is provided comprising: a) applying at least one primer layer to the substrate, b) applying at least one refinish coating composition layer to the primer layer, and c) applying at least one clearcoat layer to the refinish coating composition layer; wherein the clearcoat layer is applied when the refinish coating composition layer is wet; and wherein the refinish coating composition layer comprises the refinish coating composition.

In another embodiment of the invention, a process of coating a substrate is provided comprising: a) applying at least one primer layer to the substrate, b) applying at least one refinish coating composition layer to the primer layer, and c) applying at least one clearcoat layer to the refinish coating composition layer; wherein the refinish coating composition is applied when the primer layer is wet; and wherein the clearcoat layer is applied when the refinish coating composition is wet; and wherein the refinish coating composition layer comprises the refinish coating composition.

DETAILED DESCRIPTION OF THE INVENTION

The present invention may be understood more readily by reference to the following detailed description of the invention, and to the Examples included therein.

Before the present compositions of matter and methods are disclosed and described, it is to be understood that this invention is not limited to specific synthetic methods or to particular formulations, unless otherwise indicated, and, as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

Ranges may be expressed herein as from about one particular value, and/or to about another particular value. When such a range is expressed, it is to be understood that another embodiment is from the one particular value and/or to the other particular value.

Throughout this application, where patents or publications are referenced, the disclosures of these references in their entireties are intended to be incorporated by reference into this application provided they do not contradict the statements herein so as to more fully describe the state of the art to which the invention pertains.

As used throughout the disclosure, CAB means a cellulose acetate butyrate; CAP means a cellulose acetate propionate; and HS-CAB means a high solids cellulose acetate butyrate having a high maximum degree of substitution, a low degree of polymerization, a low intrinsic viscosity (IV), and a low molecular weight.

As used throughout this disclosure, the term cellulose mixed esters is used to define conventional cellulose mixed esters having a weight average molecular weight greater than 10,000.

As used throughout this disclosure, high solids cellulose mixed esters means a cellulose ester having a high maximum degree of substitution, a low degree of polymerization, a low intrinsic viscosity (IV), and a low molecular weight.

As used throughout the disclosure, refinish coating means coatings used to coat articles after their original manufacture, particularly in the automobile industry.

As used throughout the disclosure, high solids coating means a coating composition having a higher percent solids in the formulation than traditional coatings, which typically means coating formulations having greater than or equal to 60% solids based on the weight of the coating composition.

In one embodiment of the invention, a refinish coating composition is provided comprising: a) at least one refinish coating resin; b) at least one solvent; c) at least one pigment; d) optionally, at least one crosslinking agent; e) at least one cellulose mixed ester having a weight average molecular weight ($M_w$) greater than 10,000 and f) at least one low molecular weight cellulose mixed ester selected from the group consisting of:
   (1) a low molecular weight cellulose mixed ester having:
   a total degree of substitution per anhydroglucose unit of
      from about 3.08 to about 3.50, having the following
      substitutions:
      a degree of substitution per anhydroglucose unit of
         hydroxyl of no more than about 0.70, a degree of substitution per anhydroglucose unit of $C_3$-$C_4$ esters from about 0.80 to about 1.40, and
a degree of substitution per anhydroglucose unit of acetyl of from about 1.20 to about 2.34;
an inherent viscosity of from about 0.05 to about 0.15 dL/g, as measured in a 60/40 (wt./wt.) solution of phenol/tetrachloroethane at 25° C.;
a number average molecular weight ($M_n$) of from about 1,000 to about 5,600;
a weight average molecular weight ($M_w$) of from about 1,500 to about 10,000; and a polydispersity of from about 1.2 to about 3.5;
(2) a low molecular weight cellulose mixed ester having:
a total degree of substitution per anhydroglucose unit of from about 3.08 to about 3.50, having the following substitutions:
a degree of substitution per anhydroglucose unit of hydroxyl of no more than about 0.70;
a degree of substitution per anhydroglucose unit of $C_3$-$C_4$ esters from about 1.40 to about 2.45, and
a degree of substitution per anhydroglucose unit of acetyl of from about 0.20 to about 0.80;
an inherent viscosity of from about 0.05 to about 0.15 dL/g, as measured in a 60/40 (wt./wt.) solution of phenol/tetrachloroethane at 25° C.;
a number average molecular weight ($M_n$) of from about 1,000 to about 5,600;
a weight average molecular weight ($M_w$) of from about 1,500 to about 10,000;
a polydispersity of from about 1.2 to about 3,
(3) a low molecular weight cellulose mixed ester having:
a total degree of substitution per anhydroglucose unit of from about 3.08 to about 3.50, having the following substitutions:
a degree of substitution per anhydroglucose unit of hydroxyl of no more than about 0.70;
a degree of substitution per anhydroglucose unit of $C_3$-$C_4$ esters from about 1.40 to about 2.45, and
a degree of substitution per anhydroglucose unit of acetyl of from about 0.20 to about 0.80;
an inherent viscosity of from about 0.05 to about 0.15 dL/g, as measured in a 60/40 (wt./wt.) solution of phenol/tetrachloroethane at 25° C.;
a number average molecular weight ($M_n$) of from about 1,000 to about 5,600;
a weight average molecular weight ($M_w$) of from about 1,500 to about 10,000; and
a polydispersity of from about 1.2 to about 3.5; and mixtures of the low molecular weight cellulose mixed esters.

The refinish coating compositions of this invention provide excellent appearance properties in refinish coating applications as shown in the Examples.

The refinish coating resin can be any resin known in the art having a solids content of at least 60% by weight based on the weight of the coating composition that can be used to produce refinish coating compositions. In another embodiment of the invention, the refinish coating resin has a solids content of between about 60% by weight to about 90 by weight, or between about 60% by weight to about 80% by weight, or between about 70% by weight to about 80% by weight.

In one embodiment of the invention, the refinish coating resin can be selected from the group consisting of polyesters, polyols, polyester-amides, alkyds, polyurethanes, epoxy resins, polyamides, acrylics, vinyl polymers, polyisocyantes, melamines, phenolics, urea resins, urethane resins, and polyamides. In one embodiment of the invention, polyols include, but are not limited to, polyester polyols and acrylic polyols.

The amount of the refinish coating resin can range from about 5% by weight to about 90% by weight based on the weight of the refinish coating composition. Another range is from about 20% by weight to about 50% by weight based on the weight of the refinish coating composition.

Solvents, pigments, and crosslinking agents are discussed subsequently in this disclosure.

The cellulose mixed ester utilized in the refinish coating compositions are conventional cellulose mixed esters having a weight average molecular weight of greater than 10,000 as measured by GPC. Examples of commercial cellulose mixed esters are CAB-171-15, CAB-381-0.1, CAB-381-0.5, CAB-381-20, CAB-551-0.01, and CAB-551-0.2; all of which can be obtained from Eastman Chemical Company, Kingsport, Tenn. In another embodiment of the invention, the cellulose mixed esters have a number average molecular weight greater than 16,000. In another embodiment of the invention, the cellulose mixed ester has a degree of polymerization (DP) of greater than 50. In yet another embodiment of the invention, the cellulose mixed ester has an inherent viscosity of greater than 0.28 dL/g.

Low molecular weight cellulose mixed esters (also called high solids cellulose mixed esters) are described in U.S. Pat. No. 7,585,905, herein incorporated by reference to the extent it does not contradict the statements herein. In one embodiment, the low molecular weight cellulose mixed esters have a total degree of substitution per anhydroglucose unit of from about 3.08 to about 3.50, and having the following substitutions: a degree of substitution per anhydroglucose unit of hydroxyl of no more than about 0.70; a degree of substitution per anhydroglucose unit of $C_3$-$C_4$ esters from about 0.80 to about 1.40, and a degree of substitution per anhydroglucose unit of acetyl of from about 1.20 to about 2.34. According to this embodiment, the low molecular weight cellulose mixed esters exhibit an inherent viscosity from about 0.05 to about 0.15 dL/g, as measured in a 60/40 (wt./wt.) solution of phenol/tetrachloroethane at 25° C.; a number average molecular weight ($M_n$) of from about 1,000 to about 5,600; a weight average molecular weight ($M_w$) of from about 1,500 to about 10,000; and a polydispersity of from about 1.2 to about 3.5. In various embodiments, the low molecular weight cellulose mixed ester may comprise butyryl, or propionyl, or mixtures of the two.

In various alternative aspects, the degree of substitution per anhydroglucose unit of hydroxyl may be from about 0.05 to about 0.70; the inherent viscosity may be from about 0.05 to about 0.12 dL/g, as measured in a 60/40 (wt./wt.) solution of phenol/tetrachloroethane at 25° C.; or the number average molecular weight ($M_n$) may be from about 1,500 to about 5,000. In certain embodiments, a polydispersity may be from 1.2 to 2.5; an inherent viscosity from 0.07 to 0.11 dL/g; or a number average molecular weight ($M_n$) from about 1,000 to about 4,000. In certain other embodiments, an inherent viscosity may be from about 0.07 to about 0.11 dL/g; or a number average molecular weight ($M_n$) from about 1,000 to 4,000.

In a further embodiment, the low molecular weight cellulose mixed esters used in the refinish coating composition have a total degree of substitution per anhydroglucose unit of from about 3.08 to about 3.50, and having the following substitutions: a degree of substitution per anhydroglucose unit of hydroxyl of no more than about 0.70; a degree of substitution per anhydroglucose unit of $C_3$-$C_4$ esters from about 1.40 to about 2.45, and a degree of substitution per anhydroglucose unit of acetyl of from 0.20 to about 0.80. According to this embodiment, the low molecular weight cellulose mixed esters exhibit an inherent viscosity of from about 0.05 to about 0.15 dL/g, as measured in a 60/40 (wt./wt.) solution of phenol/tetrachloroethane at 25° C.; a number average molecular weight ($M_n$) of from about 1,000 to about 5,600; a weight average molecular weight ($M_w$) of from about 1,500 to about 10,000; and a polydispersity of from about 1.2 to about 3.5. In various embodiments, the low molecular weight cellulose mixed ester may comprise butyryl, or propionyl, or mixtures of the two.

In various alternative embodiments, the degree of substitution per anhydroglucose unit of hydroxyl may be from about 0.05 to about 0.70; the inherent viscosity may be from about 0.05 to about 0.12 dL/g, as measured in a 60/40 (wt./wt.) solution of phenol/tetrachloroethane at 25° C.; or the number average molecular weight ($M_n$) may be from about 1,500 to about 5,000. In certain embodiments, a polydispersity may be from 1.2 to 2.5; an inherent viscosity from 0.07 to 0.11 dL/g; or a number average molecular weight ($M_n$) from about 1,000 to about 4,000. In certain other embodiments, an inherent viscosity may be from about 0.07 to about 0.11 dL/g; and a number average molecular weight ($M_n$) from about 1,000 to 4,000.

In yet another embodiment, the low molecular weight cellulose mixed esters have a total degree of substitution per anhydroglucose unit of from about 3.08 to about 3.50, and have the following substitutions: a degree of substitution per anhydroglucose unit of hydroxyl of no more than about 0.70; a degree of substitution per anhydroglucose unit of $C_3$-$C_4$ esters from about 2.11 to about 2.91, and a degree of substitution per anhydroglucose unit of acetyl of from 0.10 to about 0.50. According to this embodiment, the low molecular weight cellulose mixed esters may exhibit an inherent viscosity of from about 0.05 to about 0.15 dL/g, as measured in a 60/40 (wt./wt.) solution of phenol/tetrachloroethane at 25° C.; a number average molecular weight ($M_n$) of from about 1,000 to about 5,600; a weight average molecular weight ($M_w$) of from about 1,500 to about 10,000; and a polydispersity of from about 1.2 to about 3.5. In various embodiments, the low molecular weight cellulose mixed ester may comprise butyryl, or propionyl, or mixtures of the two.

In various alternative embodiments, the degree of substitution per anhydroglucose unit of hydroxyl may be from about 0.05 to about 0.70; the inherent viscosity may be from about 0.05 to about 0.12 dL/g, as measured in a 60/40 (wt./wt.) solution of phenol/tetrachloroethane at 25° C.; or the number average molecular weight ($M_n$) may be from about 1,500 to about 5,000. In certain embodiments, a polydispersity may be from 1.2 to 2.5; an inherent viscosity from 0.07 to 0.11 dL/g; and a number average molecular weight ($M_n$) from about 1,000 to about 4,000. In certain other embodiments, an inherent viscosity may be from about 0.07 to about 0.11 dL/g; and a number average molecular weight ($M_n$) from about 1,000 to 4,000.

The low molecular weight cellulose mixed esters may have an inherent viscosity of from about 0.05 to about 0.15 dL/g, or from about 0.07 to about 0.11 dL/g, as measured in a 60/40 (wt./wt.) solution of phenol/tetrachloroethane at 25° C. (as further defined below), and a maximum degree of substitution per anhydroglucose unit from about 3.08 to about 3.50, and a degree of substitution per anhydroglucose unit of organic esters, for example those having from 1 to 12 carbon atoms, preferably $C_2$-$C_4$ alkyl esters, and more preferably saturated $C_2$-$C_4$ alkyl esters, of about 2.38 to about 3.50.

These low molecular weight cellulose mixed esters are soluble in a wide range of solvents and solvent blends, as demonstrated in the examples contained in U.S. Pat. No. 7,585,903, which has been previously incorporated by reference, making them particularly suited for custom coating formulations. The low molecular weight cellulose mixed esters may be alkyl cellulose esters, such as methylcellulose, or hydroxyalkyl cellulose esters, such as methyl-hydroxypropyl cellulose esters. However, in some embodiments, the low molecular weight cellulose mixed esters are esters that are not otherwise modified, i.e. the cellulose is modified only by the addition of organic ester functionality, not ether functionality or carboxyl functionality obtained via oxidation chemistry. Certain particular novel low molecular weight cellulose mixed esters are preferred and further provided as additional embodiments of this invention.

In yet another embodiment, the low molecular weight cellulose mixed ester has a maximum degree of substitution of from about 3.08 to about 3.50, a degree of substitution per anhydroglucose unit of hydroxyl from about 0.01 up to about 0.70, a degree of substitution per anhydroglucose unit of $C_3$-$C_4$ esters of about 0.8 to about 3.50, a degree of substitution per anhydroglucose unit of acetyl from about 0.05 to about 2.00, and having an inherent viscosity of about 0.05 to about 0.15 dL/g, as measured in a 60/40 (wt./wt.) solution of phenol/tetrachloroethane at 25° C. In various alternative embodiments, the inherent viscosity may be from about 0.07 to about 0.11 dL/g, the degree of substitution per anhydroglucose unit of hydroxyl from 0.10 to 0.70, the degree of substitution per anhydroglucose unit of $C_3$-$C_4$ esters from 1.10 to 3.25, or the degree of substitution per anhydroglucose unit of acetyl from 0.05 to 0.90. Various low molecular weight cellulose mixed esters according to this embodiment exhibit solubility in a wide range of solvents and solvent blends.

In another embodiment, the low molecular weight cellulose mixed ester has a maximum degree of substitution of from about 3.08 to about 3.50, a degree of substitution per anhydroglucose unit of hydroxyl from about 0.01 up to about 0.70, a degree of substitution per anhydroglucose unit of $C_3$-$C_4$ esters of about 0.8 to about 3.50, a degree of substitution per anhydroglucose unit of acetyl from about 0.05 to about 2.00, and having an inherent viscosity of about 0.05 to about 0.15 dL/g, as measured in a 60/40 (wt./wt.) solution of phenol/tetrachloroethane at 25° C. In various alternative embodiments, the inherent viscosity may be from about 0.07 to about 0.11 dL/g, the degree of substitution per anhydroglucose unit of hydroxyl about 0, the degree of substitution per anhydroglucose unit of $C_3$-$C_4$ esters from 2.60 to 3.40, or the degree of substitution per anhydroglucose unit of acetyl from 0.10 to 0.90. Various low molecular weight cellulose mixed esters according to these embodiments exhibit solubility in a wide range of solvents and solvent blends.

In another embodiment of the present invention, the low molecular weight cellulose mixed ester is a cellulose acetate butyrate having a maximum degree of substitution of from about 3.08 to about 3.50, and a degree of substitution per anhydroglucose unit of hydroxyl from about 0.01 to about 0.70, and a degree of substitution per anhydroglucose unit of butyryl of about 0.80 to about 3.44, and a degree of substitution per anhydroglucose unit of acetyl of about 0.05 to about 2.00, and having an inherent viscosity of 0.05 to 0.15 dL/g, as measured in a 60/40 (wt./wt.) solution of phenol/tetrachloroethane at 25° C. In various alternative embodiments, the inherent viscosity may be from 0.07 to 0.11 dL/g, the degree of substitution per anhydroglucose unit of hydroxyl from 0.10 to 0.70, butyryl from 1.10 to 3.25, or acetyl from 0.10 to 0.90. Various low molecular weight cellulose acetate butyrates according to this embodiment exhibit solubility in a wide range of solvents and solvent blends.

As a further embodiment, the low molecular weight cellulose mixed ester is a cellulose acetate propionate having a degree of substitution per anhydroglucose unit of hydroxyl from about 0.01 to about 0.70, and a degree of substitution per anhydroglucose unit of propionyl of about 0.80 to about 3.44 and a degree of substitution per anhydroglucose unit of acetyl of from about 0.05 to about 2.00, and having an inherent viscosity of about 0.05 to about 0.15 dL/g, as measured in a 60/40 (wt./wt.) solution of phenol/tetrachloroethane at 25° C. In various alternative embodiments, the inherent viscosity may be from 0.07 to 0.11 dL/g, the degree of substitution per anhydroglucose unit of hydroxyl from 0.10 to 0.70, the degree of substitution per anhydroglucose unit of propionyl from 1.10 to 3.25, or the degree of substitution per anhydroglucose unit of acetyl of from 0.10 to 0.90. Various low molecular weight cellulose acetate propionates according to this embodiment exhibit solubility in a wide range of solvents and solvent blends.

Different grades and sources of cellulose are available and are useful to produce the low molecular weight cellulose mixed esters according to the invention, and can be selected from cotton linters, softwood pulp, hardwood pulp, corn fiber and other agricultural sources, and bacterial cellulose, among others. The source of cellulose used to prepare the low molecular weight cellulose mixed esters used in this invention is important in providing a product having suitable properties. Generally, a dissolving-grade cellulose is used as starting material for preparing the low molecular weight cellulose mixed esters of this invention. In one embodiment, the dissolving-grade cellulose has an α-cellulose content of greater than 94%. Those skilled in the art will also recognize that the use of cellulose from different sources may require modifications to the reaction conditions (e.g. temperature, catalyst loading, time) in order to account for any differences in the reactivity of the cellulose.

In certain embodiments, the source of cellulose can be a natural cellulose as just described, and that the source of cellulose not be a modified cellulose such as a cellulose ether, e.g. an alkyl cellulose. Similarly, in certain embodiments, the cellulose starting material is not a carboxyalkylcellulose, such as carboxymethylcellulose, or any cellulose derivative having acid functionality. These cellulose derivatives are more expensive than the naturally-derived cellulose just described, and in many cases result in low molecular weight cellulose mixed esters that are less suitable for use in coating formulations, especially those containing appreciable amounts of organic solvents. It also follows that certain of the low molecular weight cellulose mixed esters used in the inventive refinish coating compositions have an acid value no greater than about 5, or no greater than about 1.

The low molecular weight cellulose mixed esters utilized in the refinish compositions may be prepared by a multi-step process. In this process, cellulose is water-activated, followed by water displacement via solvent exchange with an alkanoic acid such as acetic acid, followed by treatment with a higher alkanoic acid (propionic acid or butyric acid) to give a cellulose activate wet with the appropriate alkanoic acid. Next, the cellulose activate is treated with the desired anhydride, in the presence of a strong acid catalyst such as sulfuric acid, to give essentially a fully-substituted cellulose ester having a lower molecular weight than conventional cellulose esters. A solution consisting of water and an alkanoic acid is added slowly to the anhydrous "dope" solution so as to allow removal of combined sulfur from the cellulose backbone. The final addition allows a slow transition through the hydrous point to give a period of low water concentration and high temperature (as a result of the exotherm from water reacting with excess anhydride) in the reaction medium. This is important for hydrolysis of combined sulfur from the cellulose backbone. This product is then hydrolyzed using sulfuric acid to provide a partially substituted cellulose ester. Hydrolysis is important to provide gel-free solutions in organic solvents, and to provide better compatibility with other resins in coatings applications. The hydroxyl groups exposed during hydrolysis are also important crosslinking sites in many coatings applications.

Next, the sulfuric acid is neutralized after the esterification or hydrolysis reactions are complete by addition of a stoichiometric amount of an alkali or alkaline earth metal alkanoate, for example, magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of cellulose ester are isolated by diluting the final neutralized "dope" with an equal volume of acetic acid followed by precipitation of the diluted "dope" into a volume of water about 20 to 30 times its weight, to give a particle that can be easily washed with deionized water to efficiently remove residual organic acids and inorganic salts. In many cases, a fairly sticky precipitate is initially formed. The precipitate can be hardened by exchanging the precipitation liquid for fresh water and allowing the precipitate to stand. The hardened precipitate can then be easily washed and ground up as necessary.

The key descriptors of the composition of a cellulose ester are the level of substitution of the various ester groups (i.e. degree of substitution or wt. are commonly used and are discussed in detail in other parts of this application), the level of hydroxyl groups, and the size of the polymer backbone, which can be inferred from IV, viscosity, and GPC data. The key factors that influence the resulting composition of the low molecular weight cellulose mixed esters used in this invention are: acetic anhydride level, acetic acid level, butyric (or propionic) anhydride level, butyric (or propionic) acid level, water level, cellulose level, catalyst type, catalyst level, time, and temperature. One skilled in the art will appreciate that higher catalyst loadings, higher temperatures, and/or longer reaction times during esterification are used to produce the high solids cellulose mixed esters, having lower molecular weights than conventional cellulose esters.

Thus, the low molecular weight cellulose mixed esters utilized in the inventive refinish coating compositions may be prepared by a multi-step process. In the process, cellulose is water-activated, followed by water displacement via solvent exchange with an alkanoic acid such as acetic acid, followed by solvent exchange with a higher alkanoic acid (e.g. propionic acid or butyric acid) to give a cellulose-activate wet with the appropriate alkanoic acid (e.g. propionic or butyric acid). In this regard, it can be important that the starting cellulose has a 94 to 99% alpha content, preferably about 95 to 98% alpha cellulose content. The high alpha content can be important for the quality of the final products prepared therefrom. We have found that low alpha cellulose pulps can lead to poor solubility in organic solvents and consequently to poor formulations.

Next, the activated cellulose is reacted with the desired anhydride in the presence of a strong acid catalyst such as sulfuric acid to give a fully substituted cellulose ester with a lower molecular weight than conventional esters. A solution containing water and an alkanoic acid or mixture of alkanoic acids is added slowly to the anhydrous "dope" solution so as to allow removal of combined sulfur from the cellulose backbone. The final addition allows a slow transition through the hydrous point to give a period of low water concentration and high temperature (as a result of the exotherm from water reacting with excess anhydride) in the reaction medium. This is important for hydrolysis of combined sulfur from the cellulose backbone. This product is then hydrolyzed using sulfuric acid to provide a partially-substituted cellulose ester. Hydrolysis is important to provide gel-free solutions in organic solvents, and to provide better compatibility with other resins in coatings applications.

Next, the sulfuric acid is neutralized after the esterification or hydrolysis reactions are complete by addition of a stoichiometric amount of an alkali or alkaline earth metal alkanoate, for example magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of cellulose ester are isolated by diluting the final neutralized "dope" with an equal volume of acetic acid followed by precipitation of the diluted "dope" into a volume of water about 20 to 30 times its weight, to give a particle that can be easily washed with deionized water to efficiently remove residual organic acids and inorganic salts. In many cases, a fairly sticky precipitate is initially formed. The precipitate can be hardened by exchanging the precipitation liquid for fresh water and allowing the precipitate to stand. The hardened precipitate can then be easily washed and ground up as necessary.

In light of the present disclosure, those skilled in the art will readily appreciate that, of the process parameters just described, higher catalyst loadings, higher temperatures, and/or longer reaction times during esterification will be used to obtain the high solids cellulose mixed esters having lower molecular weights than conventional cellulose esters, as further evidenced in the examples contained in U.S. Pat. No. 7,585,905, which has previously been incorporated by reference.

The low molecular weight cellulose mixed esters utilized in this invention have a weight average molecular weight, $M_w$, as measured by GPC, of from about 1,500 to about 10,000; or from about 2,000 to about 8,500; a number average molecular weight, $M_n$, as measured by GPC, of from about 1,500 to about 6,000; and a polydispersity, defined as $M_w/M_n$, from about 1.2 to about 7, or from about 1.2 to about 3.5, or from about 1.2 to about 2.5.

The high solids cellulose mixed esters according to the invention, sometimes described herein as HS-CAB's, exhibit compatibility with a wide variety of co-resins, compatibility being defined as the ability of two or more resins, when mixed together, to form a stable homogeneous mixture useful as a refinish coating composition. For example, an HS-CAB with approximately 38 wt. % butyryl (sometimes described herein as an HS-CAB-38) exhibits compatibilities with Eastman's Acrylamac 2328, Akzo Nobel's Microgel, Eastman's Duramac 2314, Bayer's Desmodur 3300, Rhodia's XIDT, and Bayer's Desmodur IL, equal to or better than commercial higher-butyryl-content samples such as CAB-551-0.01 (cellulose acetate butyrate containing approximately 55 wt. % butyryl, available from Eastman Chemical Company). In some instances, high solids cellulose mixed esters having approximately 38 wt. % butyryl, or approximately 55 wt. % butyryl, are compatible at a 1:1 ester to resin loading with acrylic resins that are not compatible with many conventional molecular weight cellulose esters. Such dramatic shifts in compatibility allow formulators to use a mid-butyryl ester (about 38 wt. %) in applications that might otherwise require a higher butyryl CAB for compatibility purposes.

An advantage to being able to use a mid-butyryl ester instead of a high-butyryl ester is that when all properties aside from butyryl level and acetyl level remain constant, i.e. hydroxyl value and molecular weight, the mid-butyryl CAB has a higher $T_g$ than its high-butyryl counterpart. Another advantage to using a mid-butyryl ester over a high-butyryl ester is that mid-butyryl commercial esters are often less soluble in particular solvents and solvent blends than their high-butyryl counterparts. This same trend is generally observed when comparing mid-butyryl HS-CAB's with high-butyryl HS-CAB's of equivalent molecular weight and hydroxyl content. Without being bound by theory, we believe that the observed solubility differences between mid-butyryl and high-butyryl esters is responsible in part for the improved redissolve resistance seen with certain of the low molecular weight cellulose mixed esters when a topcoat is applied to a refinish coating composition. We believe that the combination of improved compatibility along with improved, but also differentiated, solubility will be a valuable asset to coatings formulation chemists.

Thus, conventional cellulose esters with a higher butyryl content tend to be more soluble and have a lower $T_g$ than their counterparts having lower butyryl levels. One result of increased solubility is that the redissolve resistance of the resulting coating is negatively affected. One of the key advantages of a conventional high butyryl cellulose ester such as cellulose acetate butyrate, CAB-551-0.01, produced by Eastman Chemical Company is its increased compatibility with many co-resins when compared with a mid-butyryl ester, such as, cellulose acetate butyrate, CAB-381-0.1, produced by Eastman Chemical Company. Surprising, we have found that mid-butyryl, low molecular weight cellulose mixed esters (HS-CAB-38) have better compatibility with co-resins than a conventional molecular weight high butyryl cellulose ester such as a CAB-551-0.01 produced by Eastman Chemical Company, while exhibiting a similar solubility. As a result, coatings formulators can use the low molecular weight cellulose mixed esters in refinish coating formulations that cannot tolerate the viscosity increase imparted by the addition of conventional CAB's, while providing the redissolve resistance typical of conventional cellulose mixed esters having a higher butyryl content.

As mentioned, the low molecular weight cellulose mixed esters likewise demonstrate better-than-expected redissolve resistance in certain systems. This is surprising, since the high solid cellulose mixed esters have a molecular weight lower than conventional cellulose mixed esters. One would instead expect to see a decrease in redissolve resistance with a lowering in molecular weight. As a result, coatings formulators can use the inventive esters of the invention in refinish formulations that cannot tolerate the viscosity increase imparted by the addition of conventional CAB's only, while providing the necessary redissolve resistance. The use of low molecular weight cellulose mixed esters in combination with conventional cellulose mixed esters allow for higher solids in the refinish coating composition without the necessity of additional solvent and yields similar, if not, improve appearance properties.

Traditionally, conventional cellulose mixed esters are considered to have a maximum degree of substitution (DS) of 3.0. A DS of 3.0 indicates that there are 3.0 reactive hydroxyl groups in cellulose that can be derivatized. Native cellulose is a large polysaccharide with a degree of polymerization from 700-2,000, and thus the assumption that the maximum DS is 3.0 is approximately correct. However, as the degree of polymerization is lowered, the end groups of the polysaccharide backbone become relatively more important. In the high solids cellulose mixed esters utilized in the refinish coating compositions of this invention, this change in maximum DS influences the performance of the high solids cellulose mixed esters, by changing the solubility in certain solvents and the compatibility with certain coatings resins.

Table 1 gives the $DS_{max}$ at various degrees of polymerization (DP). Mathematically, a degree of polymerization of 401 is required in order to have a maximum DS of 3.00. As the table indicates, the increase in $DS_{max}$ that occurs with a decrease in DP is slow, and for the most part, assuming a maximum DS of 3.00 is acceptable. However, once the DP is low enough, for example a DP of 21, then it becomes appropriate to use a different maximum DS for all calculations.

TABLE 1

Effect of DSMax on DP.

| DP | $DS_{Max}$ |
|---|---|
| 1 | 5.00 |
| 2 | 4.00 |
| 3 | 3.67 |
| 4 | 3.50 |
| 5 | 3.40 |
| 6 | 3.33 |
| 7 | 3.29 |
| 8 | 3.25 |
| 9 | 3.22 |
| 10 | 3.20 |
| 11 | 3.18 |
| 12 | 3.17 |
| 13 | 3.15 |
| 14 | 3.14 |
| 15 | 3.13 |
| 16 | 3.13 |
| 17 | 3.12 |
| 18 | 3.11 |
| 19 | 3.11 |
| 20 | 3.10 |
| 21 | 3.10 |
| 22 | 3.09 |
| 23 | 3.09 |
| 24 | 3.08 |
| 25 | 3.08 |
| 50 | 3.04 |
| 75 | 3.03 |
| 100 | 3.02 |
| 134 | 3.01 |
| 401 | 3.00 |

The low molecular weight cellulose mixed esters utilized in the inventive refinish compositions have a high maximum degree of substitution and a low degree of polymerization, unexpectedly exhibiting rheological performance similar to conventional cellulose esters having a much higher degree of polymerization. It is quite surprising that an HS-CAB with such a low degree of polymerization would display such rheological performance.

The low molecular weight cellulose mixed esters are easily formulated into the refinish coating compositions where they are used as rheology modifiers and/or binder components providing improved aluminum flake orientation and improved hardness. They can provide a water-clear, high gloss, protective coating for a variety of substrates, especially metal and wood.

The low molecular weight cellulose mixed esters are soluble in most classes of typical coating solvents, including ketones, esters, alcohols, glycol ethers, and glycol ether esters, while tolerating dilution with water or aromatic hydrocarbons.

Examples of typical solvents in which the low molecular weight cellulose mixed esters exhibit solubility include acetone, methyl ethyl ketone, methyl isobutyl ketone, methyl amyl ketone, methyl propyl ketone, 2-propoxyethanol, 2-butoxyethanol, ethyl 3-ethoxypropionate, ethanol, methanol isopropyl alcohol, diacetone alcohol, ethylene glycol monobutyl ether acetate, ethyl acetate, propyl acetate, isopropyl acetate, butyl acetate, isobutyl acetate diethylene glycol ethyl ether, Eastman PM acetate (propylene glycol methyl acetate), Eastman EB acetate (ethylene glycol butyl acetate), Eastman PM Solvent (propylene glycol monomethyl ether), Eastman DM Solvent (diethylene glycol methyl ether), Eastman PB Solvent (propylene glycol monobutyl ether, Eastman DE Solvent (diethylene glycol ethyl ether), Eastman PP Solvent (propylene glycol monopropyl ether), Eastman EP Solvent (ethylene glycol monopropyl ether), Eastman EB Solvent (ethylene glycol monobutyl ether), Eastman 95% Tecsol C (ethanol with methanol, MIBK and ethyl acetate as denaturants with 5% water), N-methylpyrrolidone, Eastman EEP Solvent (ethyl 3-ethoxypropionate), and other volatile inert solvents typically used in coating compositions. For example, organic solutions of the low molecular weight cellulose mixed esters can be prepared by adding 1 to 1000 parts of solvent per part of ester; 1.5 to 9 parts of solvent per part of ester is preferred.

The low molecular weight cellulose esters utilized in the refinish coating compositions are effective flow additives. Addition of the low molecular weight cellulose esters to the refinish coating compositions generally results in the elimination of surface defects in the film upon curing/drying (i.e. elimination of pinholing and orange peel). A distinct advantage that high $DS_{Max}$, low DP cellulose esters have over conventional cellulose esters is that the inventive esters have a minimal impact on solution and/or spray viscosity when added to high solids coatings formulations. The percent solids can be increased, thus reducing the VOC of the formulation. Conventional cellulose esters can be used in these same applications as flow additives, but a reduction in solids must generally accompany the addition of the conventional cellulose esters. That is, the solvent level must be increased so as to maintain a desirable viscosity. In this invention, up to 50% by weight of the conventional cellulose mixed esters are utilized with the low molecular weight cellulose mixed ester to obtain similar or improved appearance properties of the refinish coating composition while still maintaining a high solids coating without the use of more solvent, thereby reducing VOC levels.

In one embodiment of the invention, the low molecular weight cellulose mixed ester utilized in the refinish coating composition has a 29% by weight butyryl (Bu) and a 1.5% hydroxy content.

The amount of the low molecular weight cellulose mixed ester contained in the refinish coating composition can range from about 0.5 wt % to about 50 wt % based on the weight of the refinish coating resin solids. Other ranges are from about 5 wt % to about 40 wt % and from about 10 wt % to about 25 wt %.

Rheological modifiers can be utilized in the refinish coating composition. The rheological modifier can be any that is known in the art capable of changing the flow and leveling of a coating composition. Rheological modifiers include flow additives, such as waxes. The amount of the rheological modifier can range from about 0.1% to about 3% based on the weight of the film-forming polymer solids.

The solvent can be any that is known in the art for producing coating compositions. Solvents have been previously described in this disclosure. In one embodiment of this invention, the solvent is at least one organic solvent selected from the group consisting of esters, ester alcohols, ketones, aliphatic and aromatic hydrocarbons, glycol ethers, glycol ether esters, and alcohols. If in powder form, the refinish coating composition can be utilized as a powered coating composition. The amount of solvent can range from about 1% by weight to about 99% by weight.

The pigment utilized in this embodiment of the coating composition can be any that is known in the art used in refinish compositions. Pigments are discussed subsequently in this disclosure. In one embodiment of the invention, aluminum flake is utilized as a pigment.

In one embodiment of the invention, microgels can be included in the refinish coating composition. The microgel utilized in this embodiment of the refinish coating composition can be any known in the art. Microgels are non-aqueous dispersions that can either contain alcohol or be alcohol free. The amount of microgel contained in the refinish composition can range from about 10% by weight to about 40% by weight based on the weight of the film-forming polymer solids. Commercial examples of microgels include Microgel 10-1300 produced by Akzo Nobel and R-1623-M3 produced by Coroc.

Optionally, the refinish coating composition can also contain at least one crosslinking agent. In one embodiment of the invention, the crosslinking agent comprises at least one selected from the group consisting of isocyanates, melamines, and epoxies. Such melamines are preferably compounds having a plurality of —N(CH$_2$OR)$_2$ functional groups, wherein R is C$_1$-C$_4$ alkyl, preferably methyl. In general, the melamine cross-linking agent may be selected from compounds of the following formula, wherein R is independently C$_1$-C$_4$ alkyl:

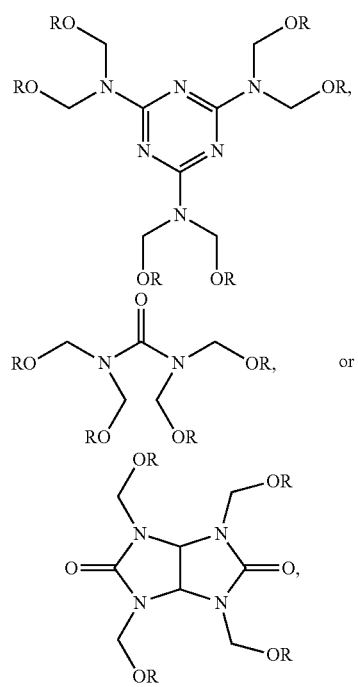

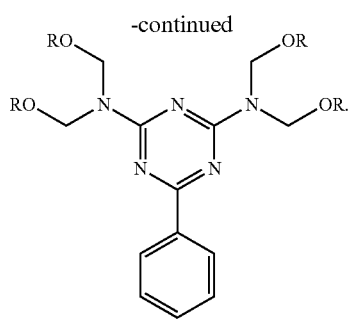

In this regard, preferred cross-linking agents include hexamethoxymethylamine, tetramethoxymethylbenzo-guanamine, tetramethoxymethylurea, mixed butoxy/methoxy substituted melamines, and the like. The most preferred melamine cross-linking agent is hexamethoxymethylamine.

Typical isocyanate crosslinking agents and resins include hexamethylene diisocyanate (HMDI), isophorone diisocyanate (IPDI), and toluene diisocyanate.

The amount of crosslinking agent may vary depending on the refinish coating resin utilized. The amount of crosslinking agent can range from about 5 weight percent to about 40 weight percent based on the total weight of low molecular weight cellulose mixed ester and refinish coating resin, or from about 10 weight percent to about 30 weight percent.

Any substrate material can be coated with the refinish coating composition according to the present invention. These include surfaces, such as, but not limited to, glass, ceramic, paper, wood and plastic. The refinish coating composition of the present invention is particularly adapted for metal substrates and specifically for use in a refinish application, such as aluminum or steel. Various blends of substrates can also be coated, for example, polypropylene, polycarbonate, polyesters, such as polyethylene terephthalate, acrylic sheeting, as well as other solid substrates. The refinish coating composition may be applied using conventional spray equipment such as air-atomized guns or electrostatic bell applicators.

The relatively high Tg (110° C.) coupled with the low butyryl content enables the low molecular weight cellulose mixed ester to provide performance benefits very similar to conventional cellulose acetate butyrates without causing a detrimental effect on the VOC levels. The incorporation of low molecular weight, high solids, cellulose mixed esters with conventional cellulose mixed esters in high-solids refinish coating compositions at additive levels (up to 10% by weight based on the refinish coating resin solids) resulted in similar and often times improved overall appearance of the refinish coating composition. These inventive refinish coating compositions are particularly suited for use in coating articles after their manufacture in order to obtain similar or improved appearance and yet reduce VOC emissions.

The solvent can be any that is known in the art for producing coating compositions. Solvents have been previously described in this disclosure. In one embodiment of this invention, the solvent is at least one selected organic solvent selected from the group consisting of esters, ester alcohols, ketones, aliphatic and aromatic hydrocarbons, glycol ethers, glycol ether esters, and alcohols. If in powder form, the coating composition can be utilized as a powered coating composition.

It is recognized that additional additives can be used in the previously described compositions, including the following: flow additives, leveling additives, wetting and dispering agents, defoamers, adhesion promoters, slip aids, anti-skinning agents, UV stabilizers, biocides, mildewcides, fungicides, pigments, and others.

The solvent can be an organic solvent or a solvent mixture.

In another embodiment of this invention, a method of for producing the refinish coating composition is provided. The method comprises contacting at least one refinish coating resin, at least one solvent, at least one pigment, optionally at least one crosslinking agent, at least one cellulose mixed ester having a weight average molecular weight greater than 10,000, and at least one high solids cellulose mixed ester to produce the refinish coating composition. The components can be contacted in any order to produce the refinish coating compositions.

In another embodiment of the invention, a method for coating a substrate is provided. The method comprises contacting at least one refinish coating resin, at least one solvent, at least one pigment, optionally at least one crosslinking agent, at least one cellulose mixed ester having a weight average molecular weight of greater than 10,000, and at least one high solids cellulose mixed ester to produce the refinish coating composition; and applying the refinish coating composition to the substrate.

In one embodiment of the invention, a process of coating a substrate is provided comprising: a) applying at least one primer layer to the substrate, b) applying at least one refinish coating composition layer to the primer layer, and c) applying at least one clearcoat layer to the refinish coating composition; wherein the refinish coating composition layer is applied when the primer layer is wet; wherein the refinish coating composition layer comprises the refinish coating composition.

In another embodiment of the invention, a process of coating a substrate is provided comprising: a) applying at least one primer layer to the substrate, b) applying at least one refinish coating composition layer to the primer layer, and c) applying at least one clearcoat layer to the refinish coating composition layer; wherein the clearcoat layer is applied when the refinish coating composition layer is wet; and wherein the refinish coating composition layer comprises the refinish coating composition.

In another embodiment of the invention, a process of coating a substrate is provided comprising: a) applying at least one primer layer to the substrate, b) applying at least one refinish coating composition layer to the primer layer, and c) applying at least one clearcoat layer to the refinish coating composition layer; wherein the refinish coating composition is applied when the primer layer is wet; and wherein the clearcoat layer is applied when the refinish coating composition is wet; and wherein the refinish coating composition layer comprises the refinish coating composition.

As used in this disclosure, the term "wet" means in the liquid state e.g. not dry. The term "wet" includes when the coating is tacky to the touch. In one embodiment of the invention, the primer layer can be applied in more than one coat. In another embodiment of the invention, the refinish composition layer can be applied in more than one coat. In another embodiment of the invention, the clearcoat layer can be applied in more than one coat. In another embodiment of the invention, the time between multiple coats of primer, refinish, or clearcoat is about 1 minute.

In one embodiment of the invention, the time between applying the primer layer and the refinish layer is a minimum of 2 minutes. In another embodiment of the invention, the time between applying the primer layer and the refinish layer is 4 minutes or more.

In one embodiment of the invention, the time between the refinish composition and clearcoat a minimum of 2 minutes. In another embodiment of the invention, the time between applying the refinish layer and the clear coat layer is 4 minutes or more.

The low molecular weight high solids cellulose mixed ester contained in the inventive refinish composition helps to prevent the primer from mixing with the refinish coating composition and from the refinish coating composition from mixing with the clearcoat.

In another embodiment, the coated substrate is routed to a curing zone. The curing zone can contain at least one oven. In one embodiment of the invention, the time between clearcoat layer application and routing to the curing zone is a minimum of about 5 minutes. In another embodiment, the amount of time if from about 7 to about 10 minutes. The oven temperature can range from about 150° F. to about 200° F. for a minimum of 5 minutes, which can be followed by a 10 minute cure at about 285° F.

In another embodiment of the invention, a process for coating a substrate is provided comprising: a) applying a primer to the substrate to produce a primed substrate; b) applying a refinish composition to the primed substrate while the primer is wet to produce a refinished substrate; and c) applying a clearcoat composition to the refinished substrate while the refinish composition is wet and optionally the primer is wet to produce a coated substrate.

As a further aspect of the present invention, the above refinish coating compositions are further comprised of one or more coatings additives. Such additives are generally present in a range of about 0.1 to 15 weight percent, based on the total weight of the composition. Examples of such coatings additives include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of additional coatings additives can be found in Raw Materials Index, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID™; polypropylene, available from Hercules Inc., under the trademark HERCOFLAT™; synthetic silicate, available from J. M Huber Corporation under the trademark ZEOLEX™; and polyethylene.

Examples of dispersing agents and surfactants include sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium isodecyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all are available from BYK Chemie U.S.A. under the trademark ANTI TERRA™. Further examples include polysiloxane copolymers, polyacrylate solution, cellulose esters, hydroxyethyl cellulose, hydrophobically modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRUBREAK of Buckman Laboratories Inc., under the BYK™ trademark of BYK Chemie, U.S.A., under the FOAMASTER™ and NOPCO™ trademarks of Henkel Corp./Coating Chemicals, under the DREWPLUS™ trademark of the Drew Industrial Division of Ashland Chemical Company, under the TROYSOL™ and TROYKYD™ trademarks of Troy Chemical Corporation, and under the SAG™ trademark of Union Carbide Corporation.

Examples of fungicides, mildewcides, and biocides include 4,4-dimethyloxazolidine, 3,4,4-trimethyl-oxazolidine, modified barium metaborate, potassium N-hydroxymethyl-N-methyldithiocarbamate, 2-(thiocyano-methylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the trade name Cyasorb UV, and available from Ciba Geigy under the trademark TINUVIN, and diethyl-3-acetyl-4-hydroxy-benzyl-phosphonate, 4-dodecyloxy-2-hydroxy benzophenone, and resorcinol monobenzoate.

In the present disclosure, the following terms have the given meanings:

As used in the examples and throughout the application, MEK means methyl ethyl ketone; MPK means methyl propyl ketone; MAK means methyl amyl ketone; PM acetate or Eastman PM acetate means propylene glycol methyl acetate; EB acetate or Eastman EB acetate means ethylene glycol butyl acetate; PM or Eastman PM means propylene glycol monomethyl ether; DM or Eastman DM means diethylene glycol methyl ether; PB or Eastman PB means propylene glycol monobutyl ether; DE or Eastman DE means diethylene glycol ethyl ether; PP or Eastman PP means propylene glycol monopropyl ether; EP Solvent or Eastman EP Solvent means ethylene glycol monopropyl ether; EB Solvent or Eastman EB Solvent means ethylene glycol monobutyl ether; Tecsol C, 95% means ethanol with methanol, MIBK and ethyl acetate as denaturants with 5% water; NMP means n-methyl pyrrolidone; and EEP Solvent or Eastman EEP Solvent means ethyl 3-ethoxypropinate.

Any substrate material can be coated with the refinish coating composition according to the present invention. These include surfaces, such as, but not limited to, glass, ceramic, paper, wood and plastic. The refinish coating composition of the present invention is particularly adapted for metal substrates and specifically for use in a refinish coating application. The refinish coating composition may be applied using conventional spray equipment such as air-atomized guns or electrostatic bell applicators.

EXAMPLES

Application Method

Six refinish coating compositions were formulated, prepared, and reduced to iso-viscosity of approximately 16 seconds Ford Cup 4. The refinish samples were spray applied by a experienced painter in a local automotive repair shop (Pro Body Shop; Kingsport, Tenn.). For each of the six refinish samples, four e-coated panels were coated; (1) aluminum STG Full Curved Panel (Part No. 100111-RCP) supplied from StarTech Services along with (3) CRS E-coated 4 inch× 12 inch×0.032 inch flat panels (Part No. APR37470) supplied from ACT Laboratories. Prior to initiation of the application work, all the substrate panels were scuffed by hand using 2000 grit sandpaper, wiped clean with isopropanol, and relocated inside the spray booth. To minimize defects in the refinish coating composition application, a final wipe of all panels using a DuPont tack cloth was performed by repair personnel immediately prior to application. A Sata RP-2000 (1.3 mm fluid nozzle) gun was used to apply the refinish coating composition in 3 coats, with a 5 minute flash between coats. All six refinish coating compositions were spray applied in succession at 72° F. Once the refinish coating composition application was complete a thirty minute flash time elapsed prior to application of the top coat. All panels, excluding (1) flat panel for each refinish coating composition sample, were top coated with the Commercial Refinish Clearcoat (Spies-Hecker 8035) routinely used by the repair shop. A Sata RP-3000 (1.3 mm fluid nozzle) gun was used to apply the clearcoat in 1.5 coats, with a 1 minute flash between coats. Once the clearcoat application was completed, the spray booth temperature was increased to 155° F. and held at that temperature for 30 minutes. Following the 30 minute bake time, the booth was allowed to cool to 72° F. All panels were then removed from the spray booth, sat aside and allowed to sit overnight prior to appearance data being collected on all panels. Dry film thickness, Wavescan, and X-rite data were collected from the flat panels only. The curved panels were applied for display purposes only.

Data Collection Methods

Wave Scan Measurement Procedure:

In this study, a BYK-Gardner wave-scan dual instrument was used to measure the optical profile of the high gloss surface of the panels by using a laser light source. An additional, infrared high energy LED, which was another part of the wave-scan dual instrument, measured the same surface spectrum (0.1-30 mm). The dullness measurement collected by the wave-scan due instrument gave information on the image forming qualities of the surface caused by structures <0.1 mm. ASTM D5767-95 (2004) "Standard Test Methods for Instrumental Measurement of Distinctness-of-Image Gloss of Coating Surfaces," ASTM International, served as the standard by which the referenced data were collected. Three readings were taken on each experimental panel. Averaged values for Wa, Wb, Wc, Wd, We, Distinctness of Image (DOI), Dullness (Du), Long wave (LW), and Short wave (SW) were reported.

X-Rite Measurement Procedure:

An X-Rite Model MA68II Portable Multi-Angle Spectrophotometer was used to collect Flop index values, as well as L* data at 15°, 45°, 75° and 110° angles. The instrument was calibrated with supplied calibration standards prior to sample evaluation. Flop Index is the measurement on the change in reflectance of a metallic color as it is rotated through the range of viewing angles. A flop index of 0 indicates a solid color, while a very high flop metallic or pearlescent refinish/clear coat color may have a flop index of 15-17.

$$\text{Flop Index} = \frac{2.69(L^*_{15°} - L^*_{110°})^{1.11}}{(L^*_{45°})^{0.86}}$$

A three reading average of each data point was reported.

Dry Film Thickness (DFT) Measurement Procedure:

A Positector 6000 FN1 coating thickness gauge (s/n 6747) obtained from Paul N. Gardner Co. was used to determine the dry film thickness of both the refinish coating composition and clearcoat applied. The instrument was calibrated and standardized at a value of 0 mils on the uncoated E-coat panel. A three reading average was reported for the refinish coating composition and clearcoat on each panel.

Commericial Materials Used in Examples

Setal 1603 Polyester Resin manufactured by Nuplex Resins.
Paraloid B-66 Acrylic Resin manufactured by Rohm and Haas.
DPA cellulose mixed esters manufactured by Eastman Chemical Company.
Ceratix 8461 wax manufactured by BYK Additives and Instruments
BYK-306 Flow Additive manufactured by BYK Additives and Instruments
Cymel 327 Melamine Resin manufactured by Cytex.
CAB381-20 and CAB381-2 manufactured by Eastman Chemical Company.
Eckart 3540 Aluminum Flake manufactured by Eckart.

TABLE 2

Automotive Refinish Coating Compositions

| | Weight (g) | | | | | |
|---|---|---|---|---|---|---|
| Material | Comparative Ex. 1 | Comparative Ex. 2 | Inventive Ex. 1 | Inventive Ex. 2 | Inventive Ex. 3 | Inventive Ex. 4 |
| Setal 1603 Polyester Resin (78% TS) | 30.8 | 30.8 | 30.8 | 27.2 | 30.8 | 30.8 |
| Paraloid B-66 Acrylic Resin (50% TS) | 160 | 160 | 160 | 141.6 | 160 | 160 |
| DuPont 805J Colorant (50% TS) | 4 | 4 | 4 | 4 | 4 | 4 |
| DuPont 890J Colorant (50% TS) | 4 | 4 | 4 | 4 | 4 | 4 |
| Ceratix 8461 Wax (5% TS) | 44 | 44 | 44 | 44 | 44 | 44 |
| Cymel 327 Melamine Resin | 4 | 4 | 4 | 4 | 4 | 4 |
| BYK 306 Flow Additive | 4 | 4 | 4 | 4 | 4 | 4 |
| Eckert 3540 Aluminum Flake (70% TS) | 25.6 | 25.6 | 25.6 | 25.6 | 25.6 | 25.6 |
| CAB381-20 (10% TS) | 120 | 0 | 0 | 0 | 0 | 0 |
| CAB381-2 (20% TS) | 0 | 60 | 0 | 0 | 0 | 0 |
| DPA 2386 (40% TS) | 0 | 0 | 30 | 60 | 0 | 0 |
| 80% DPA2386/ 20% CAB381-20 (30% TS) | 0 | 0 | 0 | 0 | 40 | 0 |
| 90% DPA 2386/10% CAB381-20 (30% TS) | 0 | 0 | 0 | 0 | 0 | 40 |
| DuPont 7175 S Reducing Solvent | 3.6 | 63.6 | 93.6 | 85.6 | 83.6 | 83.6 |
| | 400 | 400 | 400 | 400 | 400 | 400 |
| Physical Properties: | | | | | | |
| Solids as prepared (wt %) | 37 | 37 | 37 | 37 | 37 | 37 |
| Measured Solids (wt %) | 18.2 | 22.8 | 30.7 | 28.6 | 26.7 | 22.3 |
| #4 Ford Cup Viscosity | 16.1 | 15.8 | 15.6 | 16 | 16 | 16 |
| Add'l Solvent to reach 16 s (#4 Ford Cup) | 400 | 325 | 220 | 300 | 352 | 355 |
| lb/Gallon | 7.23 | 7.37 | 7.6 | 7.49 | 7.44 | 7.33 |
| VOC (g/liter) | 708.0 | 682.5 | 631.8 | 641.5 | 654.1 | 683.2 |

TS—Total Solids in Weight Percent

Invention Data

TABLE 3

Appearance Data

| Example # | Description | Coat | Wavescan Data CF | Wavescan Data DOI | Wavescan Data Dullness | Color Data Flop Index |
|---|---|---|---|---|---|---|
| Comparative Example 1 | Control (CAB381-20) TS = 18.2% | BC BC/CC | 25 | 69.2 | 48.2 | 25.37 22.09 |
| Comparative Example 2 | Control (CAB381-2) TS = 22.8% | BC BC/CC | 38.9 | 76 | 36.7 | 22.93 20.49 |
| Inventive Example 1 | 10% DPA 2386 TS = 30.7% | BC BC/CC | 34.5 | 71.5 | 43.9 | 22.44 21.05 |
| Inventive Example 2 | 20% DPA 2386 TS = 28.6% | BC BC/CC | 47.8 | 81.5 | 27.8 | 22.37 20.97 |
| Inventive Example 3 | 80% DPA 2386/CAB381-20 TS = 26.7% | BC BC/CC | 41 | 80.1 | 32.2 | 18.53 18.2 |
| Inventive Example 4 | 90% DPA 2386/CAB 381-20 TS = 22.3% | BC BC/CC | 35.7 | 75.7 | 37.1 | 20.14 16.8 |

TS—Total Solids (wt %)
BC—Refinish Coating Composition
CC—Clearcoat
CF—Combined Ford Value, which is the average of gloss, DOI, and Dullness From this data, it is shown that the solids of the refinish coating compositions were increased, while the appearance data remained relatively constant or was improved; thereby allowing for a reduction in solvents which lowers the VOC content of the refinish coating composition.

That which is claimed is:

1. A refinish coating composition comprising: a) at least one refinish coating resin; b) at least one solvent; c) at least one pigment; d) optionally, at least one crosslinking agent; e) at least one cellulose mixed ester having a weight average molecular weight ($M_w$) greater than 10,000; and f) at least one low molecular weight cellulose mixed ester selected from the group consisting of:
   (1) a low molecular weight cellulose mixed ester having:
      a total degree of substitution per anhydroglucose unit of from 3.08 to about 3.50, having the following substitutions:
         a degree of substitution per anhydroglucose unit of hydroxyl of no more than about 0.70,
         a degree of substitution per anhydroglucose unit of $C_3$-$C_4$ esters from about 0.80 to about 1.40, and
         a degree of substitution per anhydroglucose unit of acetyl of from about 1.20 to about 2.34;
      an inherent viscosity of from 0.05 to 0.12 dL/g, as measured in a 60/40 (wt./wt.) solution of phenol/tetrachloroethane at 25° C.;
      a number average molecular weight ($M_n$) of from about 1,000 to about 5,600;
      a weight average molecular weight ($M_w$) of from about 1,500 to about 10,000; and
      a polydispersity of from about 1.2 to about 3.5;
   (2) a low molecular weight cellulose mixed ester having:
      a total degree of substitution per anhydroglucose unit of from 3.08 to about 3.50, having the following substitutions:
         a degree of substitution per anhydroglucose unit of hydroxyl of no more than about 0.70;
         a degree of substitution per anhydroglucose unit of $C_3$-$C_4$ esters from about 1.40 to about 2.45, and
         a degree of substitution per anhydroglucose unit of acetyl of from about 0.20 to about 0.80;
      an inherent viscosity of from 0.05 to 0.12 dL/g, as measured in a 60/40 (wt./wt.) solution of phenol/tetrachloroethane at 25° C.;
      a number average molecular weight ($M_n$) of from about 1,000 to about 5,600;
      a weight average molecular weight ($M_w$) of from about 1,500 to about 10,000;
      a polydispersity of from about 1.2 to about 3,
   (3) a low molecular weight cellulose mixed ester having:
      a total degree of substitution per anhydroglucose unit of from 3.08 to about 3.50, having the following substitutions:
         a degree of substitution per anhydroglucose unit of hydroxyl of no more than about 0.70;
         a degree of substitution per anhydroglucose unit of $C_3$-$C_4$ esters from about 1.40 to about 2.45, and
         a degree of substitution per anhydroglucose unit of acetyl of from about 0.20 to about 0.80;
      an inherent viscosity of from 0.05 to 0.12 dL/g, as measured in a 60/40 (wt./wt.) solution of phenol/tetrachloroethane at 25° C.;
      a number average molecular weight ($M_n$) of from about 1,000 to about 5,600;
      a weight average molecular weight ($M_w$) of from about 1,500 to about 10,000; and
      a polydispersity of from about 1.2 to about 3.5;
   and mixtures of said low molecular weight cellulose mixed esters.

2. The refinish coating composition according to claim 1, wherein the $C_3$-$C_4$ ester of said low molecular weight cellulose mixed ester comprises butyryl, and wherein said low molecular weight cellulose mixed ester forms a clear solution as a 10 weight percent mixture in at least one solvent selected from the group consisting of propylene glycol monomethyl ether, propylene glycol methyl acetate, diethylene glycol methyl ether, and mixtures thereof.

3. The refinish coating composition according to claim 1, wherein the $C_3$-$C_4$ ester in said low molecular weight cellulose mixed ester comprises propionyl.

4. The refinish coating composition according to claim 1, wherein the degree of substitution per anhydroglucose unit of hydroxyl in said low molecular weight cellulose mixed ester is from about 0.05 to about 0.70.

5. The refinish coating composition according to claim 1, wherein the number average molecular weight ($M_n$) of said low molecular weight cellulose mixed ester is from about 1,500 to about 5,000.

6. The refinish coating composition according to claim 1, wherein the polydispersity of said low molecular weight cellulose mixed ester is from 1.2 to 2.5.

7. The refinish coating composition according to claim 1, wherein the $C_3$-$C_4$ ester in said low molecular weight cellulose mixed ester comprises butyryl, and wherein said low molecular weight cellulose mixed ester exhibits a viscosity no greater than 6,000 centipoise as a 50 wt. % solution in a 90/10 by weight mixture of n-butyl acetate/xylene.

8. The refinish coating composition according to claim 1, wherein the $C_3$-$C_4$ ester of said low molecular weight cellulose mixed ester comprises butyryl, and wherein said low molecular weight cellulose mixed ester forms a clear solution as a 10 weight percent mixture in at least one solvent selected from the group consisting of C-11 ketone, diisobutyl ketone, propylene glycol monopropyl ether, ethylene glycol monopropyl ether, ethylene glycol monobutyl ether, methanol, toluene, and 90/10 by weight isopropyl alcohol/water blend.

9. The refinish coating composition according to claim 1 wherein said refinish coating resin is at least one selected from the group consisting of polyesters, polyester-amides, alkyds, polyurethanes, epoxy resins, polyamines, acrylics, vinyl polymers, polyisocyanates, melamines, phenolics, urea resins, urethane resins, polyamides, and other cellulose esters.

10. The refinish coating composition according to claim 1 wherein the total amount of said cellulose mixed ester and said low molecular weight cellulose mixed ester ranges from about 1% by weight to about 20% by weight based on the weight of said refinish coating composition.

11. The refinish coating composition according to claim 10 wherein the amount of said cellulose mixed ester to said low molecular weight cellulose mixed ester is in a ratio of up to 50:50 by weight based on the weight of said refinish coating composition.

12. The refinish coating composition according to claim 11 wherein the amount of said cellulose mixed ester to said low molecular weight cellulose mixed ester is in a ratio of 5:95; 10:90; 15:85; 20:80; 25:75; 30:70; 35:65; 40:60; or 45:55.

13. A shaped or formed article coated with the refinish coating composition of claim 1.

14. A process of coating a substrate said process comprising: a) applying at least one primer layer, b) applying at least one refinish coating composition layer to said primer layer, and c) applying at least one clearcoat layer to said refinish coating composition layer of claim 1.

15. A process of coating a substrate said process comprising: a) applying at least one primer layer to said substrate, b) applying at least one refinish coating composition layer to said primer layer, and c) applying at least one clearcoat layer to said refinish coating composition; wherein said refinish coating composition layer is applied when said primer layer is wet; wherein said refinish coating composition layer comprises said refinish coating composition according to claim 1.

16. A process of coating a substrate said process comprising: a) applying at least one primer layer to said substrate, b) applying at least one refinish coating composition layer to said primer layer, and c) applying at least one clearcoat layer to said refinish coating composition layer; wherein said clearcoat layer is applied when said refinish coating composition layer is wet; and wherein said refinish coating composition layer comprises said refinish coating composition according to claim 1.

17. A process of coating a substrate said process comprising:
a) applying at least one primer layer to said substrate, b) applying at least one refinish coating composition layer to said primer layer, and c) applying at least one clearcoat layer to said refinish coating composition layer; wherein said refinish coating composition is applied when said primer layer is wet; wherein said clearcoat layer is applied when said refinish coating composition is wet; and wherein said refinish coating composition layer comprises said refinish coating composition according to claim 1.

* * * * *